United States Patent

Rees et al.

[11] Patent Number: 5,108,600
[45] Date of Patent: Apr. 28, 1992

[54] SURFACE CLEANING APPARATUS

[76] Inventors: David W. Rees, c/o 125 E. 13th St., North Vancouver, B.C.; John N. Koblanski, 1205-4160 Sardis St., Burnaby, B.C. both of Canada

[21] Appl. No.: 707,378
[22] Filed: May 30, 1991
[51] Int. Cl.⁵ .............................................. E02B 13/04
[52] U.S. Cl. ................................. 210/242.3; 210/923; 210/519; 417/160; 417/172
[58] Field of Search .................. 210/242.3, 242.1, 776, 210/923, 220, 538, 540, 519; 417/160, 167, 168, 172, 176

[56] References Cited

U.S. PATENT DOCUMENTS

| 310,896 | 1/1885 | Kleiman | 417/176 |
|---|---|---|---|
| 640,463 | 1/1900 | Gilden | 417/172 |
| 2,909,127 | 10/1959 | Bradaska | 417/172 |
| 3,010,232 | 11/1961 | Skikel et al. | 417/176 |
| 3,726,406 | 4/1973 | Damberger | 210/923 |
| 4,059,526 | 11/1977 | Middelbeek | 210/923 |
| 4,305,830 | 12/1981 | Shimura | 210/923 |
| 4,308,006 | 12/1981 | Koblanski | 210/923 |
| 4,425,240 | 1/1984 | Johnson | 210/242.3 |

Primary Examiner—Stanley S. Silverman
Assistant Examiner—Christopher Upton
Attorney, Agent, or Firm—Townsend and Townsend

[57] ABSTRACT

A separator jet to separate a first liquid from a second liquid upon which the first liquid is floating. The separator jet has a main body with a base and a top. There is an inlet nozzle in the base to receive a transport fluid. An outlet nozzle with a diameter larger than the inlet nozzle receives fluid from the inlet nozzle and is positioned within the main body to define an inlet for the first and second liquids in the top of the main body. An inlet in the base of the outlet nozzle, adjacent the inlet nozzle, receives the first and second liquids and allows the first and second liquids to be transported by the transport fluid out of the outlet nozzle. The jet may be mounted on a float and, in the preferred embodiment, may be mounted on a vessel that can be anchored in a waterway to clear oil from that waterway or mounted to be able to sail in polluted water.

23 Claims, 7 Drawing Sheets

SURFACE CLEANING APPARATUS

FIELD OF THE INVENTION

This invention relates to a separator jet useful to separate a first liquid from a second liquid upon which the first liquid is floating, that is the second liquid is less dense than the first. The invention also extends to a vessel useful to separate the liquids and including a separator jet.

The invention finds application wherever it is required to separate two immiscible liquids of different density. However, it finds particular application in the cleaning of oil spills and in the removal of oil from waste-water in the petrochemical industry.

DESCRIPTION OF THE PRIOR ART

There are large numbers of ways of removing oil spills from water but their performance has been poor. Known methods include positive pressure generated by a ceramic or magnetostrictive transducers, but these approaches have the disadvantages of expense and difficult operation and have failed completely in removing highly emulsified oils or foaming materials because emulsified oils and foaming materials have lowered surface tensions and transducers depend upon the surface tension of the material to be separated.

Suction methods also are limited since it is difficult to maintain the inlet to the suction apparatus at the appropriate level.

Non-floating vacuum vessels with large intakes have the attraction of not being easily plugged by debris. However, they require large amounts of energy and because of the problems in detecting the interface between the two liquids to be separated, usually oil and water, they frequently pick up more water than oil.

Dispersion of oil by the use of detergents has been widely practised. However, bearing in mind the low temperatures that can be involved and the means of application of the detergents, the results have been disappointing. In general, these detergents are now regarded as environmentally undesirable and are only used in extreme circumstances because of the large volume needed in these previous methods.

The use of floating vessels to collect oil spills has not proved a success. The result in calm seas have been poor and, obviously, the rougher the water the less efficient the process. The main problem is the difficulty in detecting the interface between the two liquids. With a floating vessel this problem is made worse by the fact that the vessel tends to produce a bow wave in front of the pick-up device. The bow wave tends to push the floating oil away thus decreasing collecting efficiency. It is important that there be a clear a path as possible for the water flowing into the device if the oil is to be collected efficiently. However, the prior art frequently mounts the oil collection apparatus either at the bow or the stern of the vessel, resulting in unnecessary large movements of the mechanism relative to the water surface.

The above prior systems are dependent upon flotation systems for locating the oil/water interface and prior art systems of detecting the interface by this means have been too slow to react to the wave action.

International Patent application PCT/CA90/00425 describes a surface separator and dispersion apparatus where the placement of an intake co-axially with the jet and at approximately the same level causes the surface to depress to concentrate the upper layer which is then removed by the jet into a collection device.

The results achieved with this apparatus have been excellent but the above application does require a substantial amount of piping from the jet device to the intake of a pump. Problems can occur when debris enters the pump and there have also been some problems with the emulsification of some types of oils.

SUMMARY OF THE INVENTION

The present invention seeks to overcome the disadvantages of all the prior art, including the copending International application, by using the pressure of an operating medium to create suction at an intake.

Accordingly, in a first aspect, the present invention is a separator jet to separate a first liquid from a second liquid upon which the first liquid is floating, the separator jet comprising a main body having a base and a top; an inlet nozzle in the base to receive a transport fluid; an outlet nozzle to receive fluid from the inlet nozzle and positioned within the main body to define an inlet for the first and second liquids in the top of the main body; an inlet in the base of the outlet nozzle, adjacent the inlet nozzle, to receive the first and second liquids and to allow the first and second liquids to be transported by the transport fluid out of the outlet nozzle.

The main body of the separator jet is generally tulip shaped according to the preferred embodiment and has an opening in the base to receive the inlet nozzle. Similarly, it is preferable that the outlet nozzle be generally tulip shaped and defines a passage between the outer surface of the outlet nozzle and the inner surface of the main body and base of the main body.

In instances where it is not environmentally harmful, an additional inlet for a dispersant may also be provided.

In a further aspect the present invention is a vessel useful to remove a first liquid floating on a second liquid from the second liquid, the vessel comprising a hull; at least one separator jet, each jet comprising a main body having a base and a top; a first inlet in the base to receive a transport fluid; an inlet nozzle fed by the first inlet; an outlet nozzle to receive fluid from the inlet nozzle and positioned within the main body to define an inlet with the first and second liquids in the top of the main body; an inlet in the base of the outlet nozzle, adjacent the inlet nozzle, to receive the first and second liquids and to allow the first and second liquids to be transported by the transport fluid out of the outlet nozzle.

BRIEF DESCRIPTION OF THE DRAWINGS

The invention is illustrated, by way of example, in the accompanying drawings in which.

DESCRIPTION OF THE PREFERRED EMBODIMENTS

Figure 1:
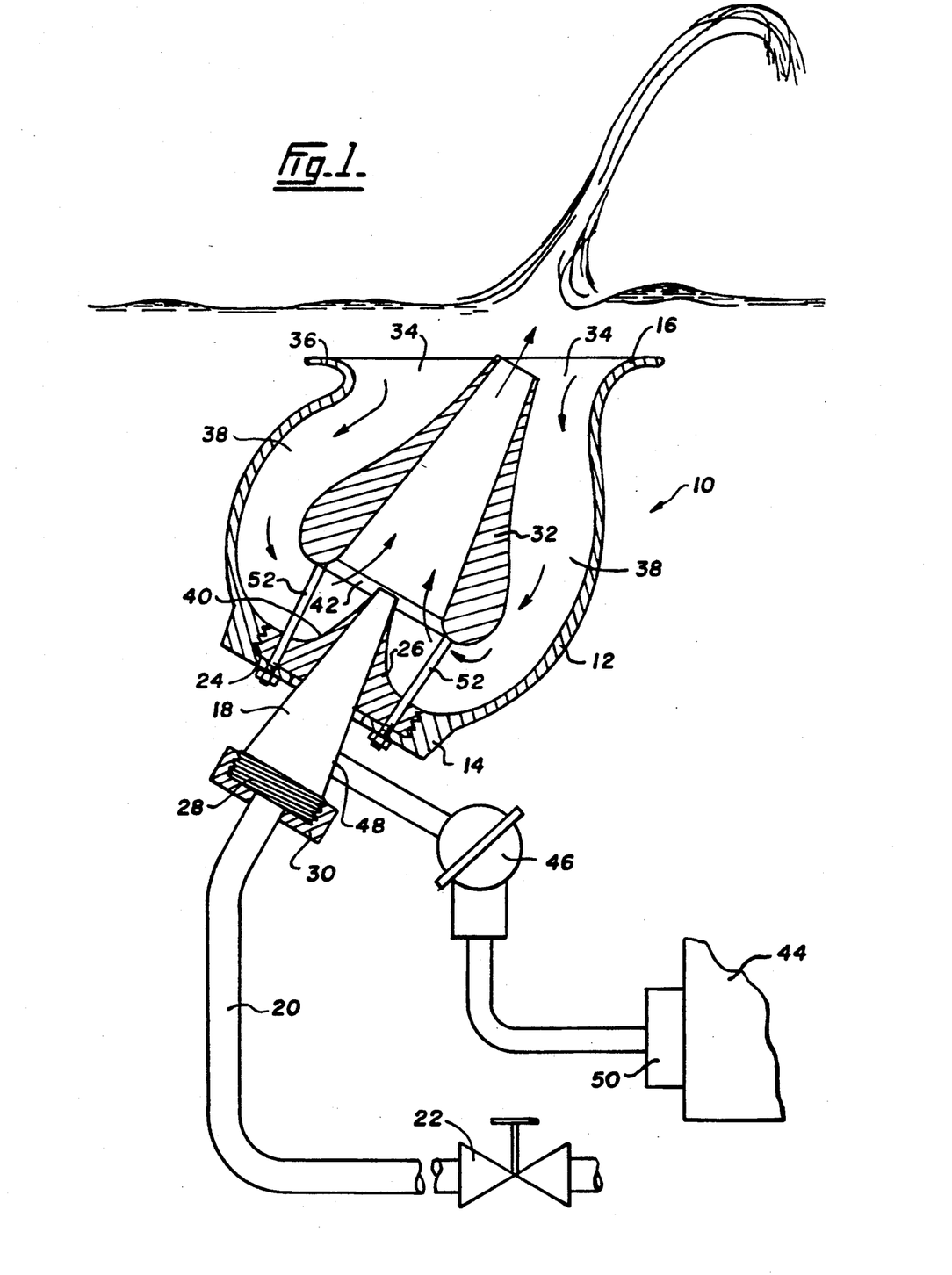
FIG. 1 is a section through separator jet according to the present invention.
Figure 2:
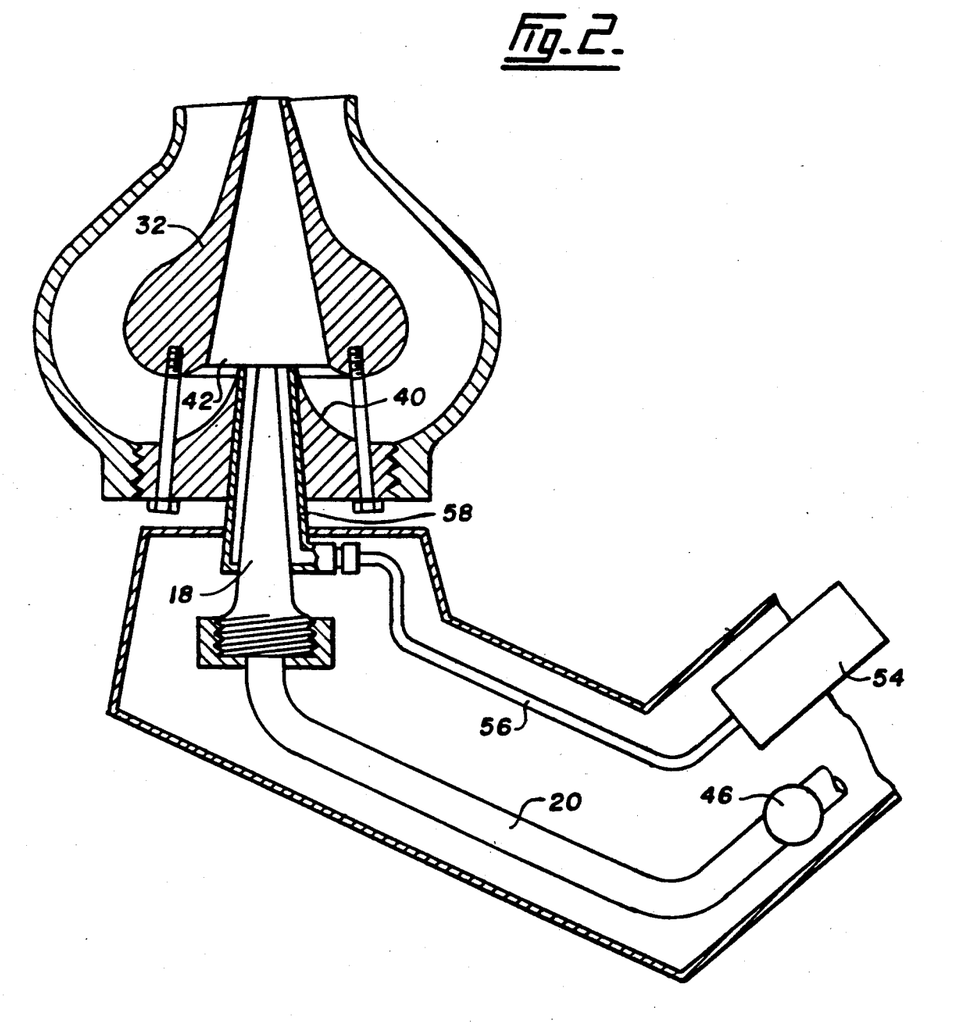
FIG. 2 illustrates a further embodiment of the separator jet according to the present invention.

FIGS. 1 and 2 show a separator jet 10 to separate a first liquid from a second liquid upon which the first liquid is floating. A typical first liquid would be oil, the second liquid would be water.

The separator jet 10 comprises a main body 12 having a base 14 and a top 16. There is an inlet nozzle 18 in the base to receive a transport fluid fed along a pipe 20 controlled by a valve 22. The inlet nozzle 18 is mainly outside body 12 and is located in an opening 24 in the base formed with an internal thread. There is a threaded flange 26 on the inlet nozzle 18 received by the internal thread of the opening 24.

The inlet nozzle 18 is provided with a thread 28 adjacent its lower end which is attached to a collar 30 having an internal thread. This arrangement is a conventional arrangement of attaching a pipe to a fixture.

An outlet nozzle 32 receives fluid from the inlet nozzle 18 and is positioned within the main body 12 in such a way as to define an inlet 34 for the first and second liquids in the top 16 of the main body 12. The main body 12 is generally tulip shaped and has a lip 36 at its top to facilitate the ingress of the first and second liquids. The outlet nozzle 32 is also generally tulip shaped and defines a passage 38 between the outer surface of the outlet nozzle 32 and the inner surface of the main body 12 that narrows at 40, that is adjacent the base of the main body. A contoured portion 40 of flange 26 also defines the passage 38 and provides a smooth flow path.

The outlet nozzle 32 has an internal diameter larger than the internal diameter of the inlet nozzle 18.

The passage 38 communicates with an inlet 42 in the base of the outlet nozzle 32, adjacent the inlet nozzle 18. Thus inlet 18 receives the first and second liquids from the passage 38 and receives transport fluid from the inlet nozzle 18 which transports the first and second liquids out of the outlet nozzle 32 to a collection point.

FIG. 1 also shows that the separator jet main body 12 is pivotally attached to a float 44 by a pivotal joint 46 attached to the inlet jet at 48 and to the float at 50.

FIG. 1 also shows the use of support members 52 extending from the flange 26 to carry the outlet nozzle 32.

FIG. 2 illustrates a variation of the embodiment of FIG. 1 in the provision of a supply 54 of a dispersant, typically a detergent, which feeds through pipe 56 into a jacket 58 surrounding the inlet nozzle 18 and thus to the outlet nozzle 32 through the inlet 42 in the base of the outlet nozzle 32.

To operate the separator jet according to FIGS. 1 and 2, the jet 10 is submerged in contaminated water. The height of the jet is set by controlling the ballast in the float 44 and the angle of the jet is set by the pivotal joint 46 which can be released then tightened for adjustment. A supply of transport fluid under pressure, typically steam or water, is forced through pipe 20. As the transport liquid passes through the inlet nozzle 18 and through the outlet nozzle 32, it draws in first and second liquid through the inlet 34 at the top of the main body 10. The mixture of transport fluid, and the two liquids, is forced through the outlet nozzle 32 to a receptacle. If it is environmentally acceptable, then the embodiment of FIG. 2 can be used and a dispersant can be injected through the outlet nozzle 32 to assist in the emulsification of the oil.

The transport fluid is desirably operated at high pressure creating a considerable suction effect at the inlet 42 in the base of the outlet nozzle 32. It should also be noted that, particularly when steam is used to transport fluid, the embodiment of FIG. 1 is perfectly satisfactory, that is a dispersant is not necessary. However, if highly weathered oil is present, then a small quantity of dispersant is desirable, that is the embodiment of FIG. 2 is preferred.

Figure 3:
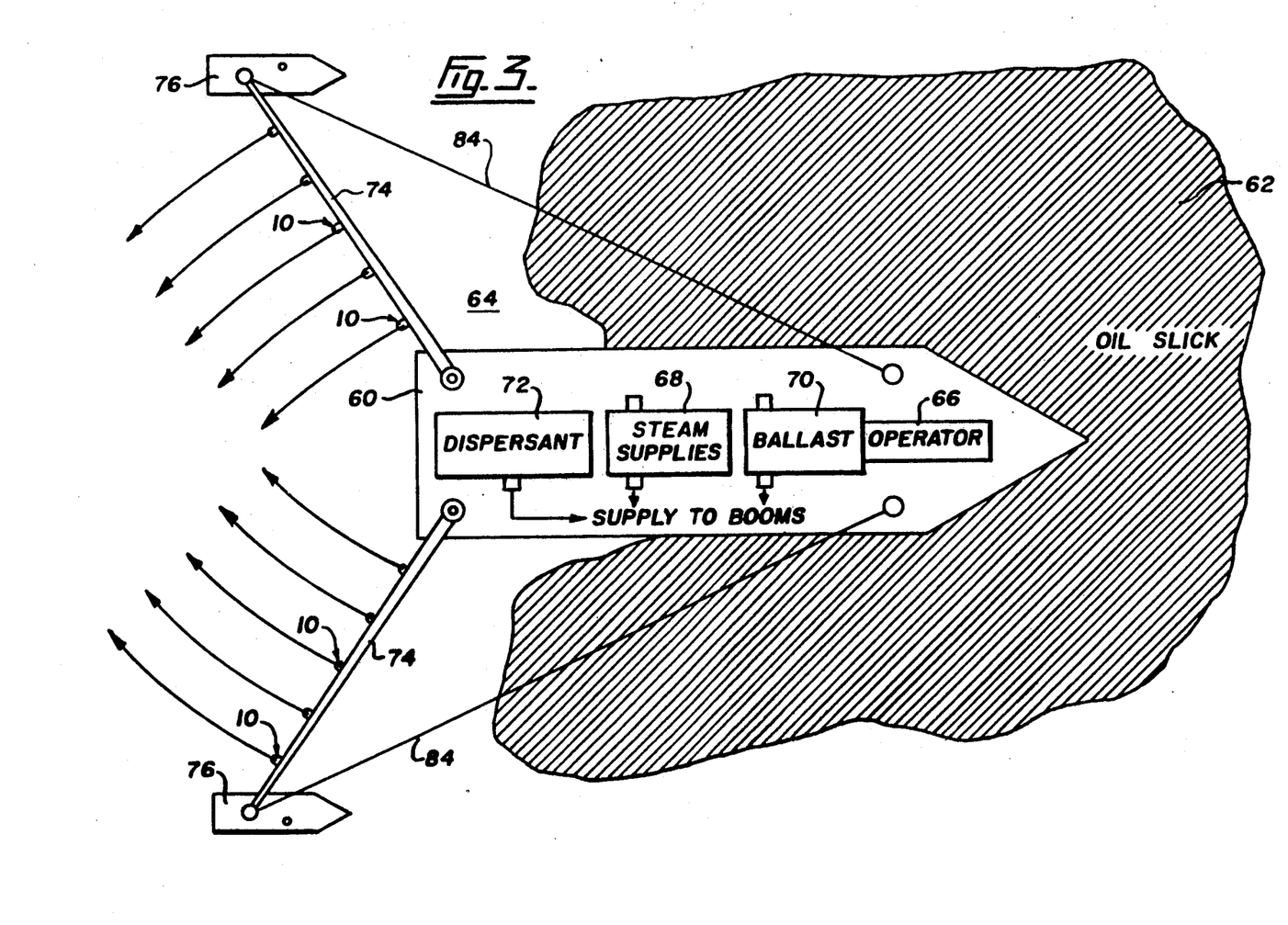
FIG. 3 is a planned view of a vessel according to the present invention.

FIG. 3 shows a vessel 60 that is useful to remove a first liquid 62 floating on a second liquid 64 from the second liquid. As illustrated in FIG. 3, the first liquid 62 is an oil slick and the vessel 60 sails through the oil slick. There is a cabin 66 for the operator who is suitably protected from the hostile environment. There is a source of transport fluid 68 on the hull, typically a steam supply, ballast 70 for the hull and a source of dispersant 72. FIG. 3 shows a pair of booms 74, each extending from pivotal anchor points 76 outwardly from the stern of the vessel 60. A plurality of separator jets 10 are mounted on the booms 74 to receive transport fluid from the hull 60.

Figure 3A:
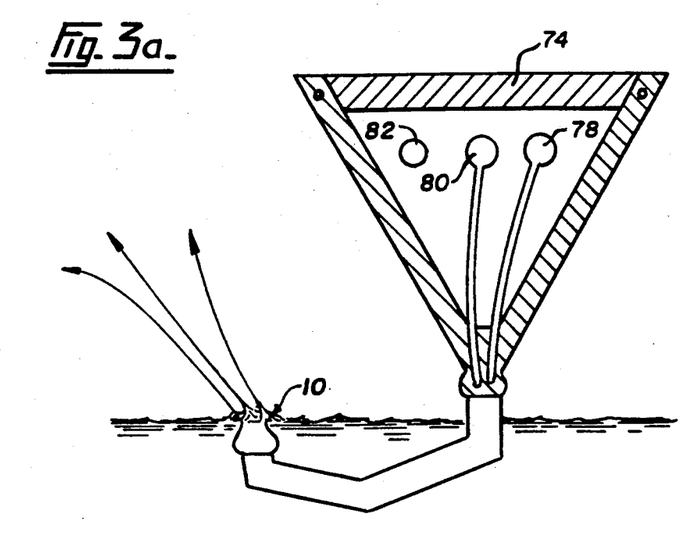
FIG. 3A is a detail of the vessel of FIG. 3.

As shown particularly in FIG. 3A, each boom 74 is triangular in section and extends to a float 76 remote from the hull 60. There are pipes in the boom 74, the first pipe 78 carries transport fluid from the hull 60 to the separator jets 10. The second pipe 80 carries a dispersant, if necessary, and the third pipe 82 carries ballast to the float 76. FIG. 3 is a result of relatively simple structure and it is principally intended for operation where it is environmentally acceptable to add a dispersant and feed the emulsified oil back into the water.

Thus, in use, the vessel 60 is sailed by the operator through the oil slick 62 as shown in FIG. 3. The ballast supply to the floats 76 is controlled to regulate the heights of the jets 10 beneath the surface, as shown particularly in FIG. 3A. FIG. 3 also shows the use of stabilizing cables 84 extending from the vessel 60 to the floats 76. When the heights of the separator jets 10 is set appropriately with the ballast, then steam and dispersant are fed through pipes 78 and 80 to the separator jets 10. The dispersed oil is forced upwardly and back into the water where the presence of the dispersant helps to disperse the emulsified oil throughout the body of water.

Figure 4:
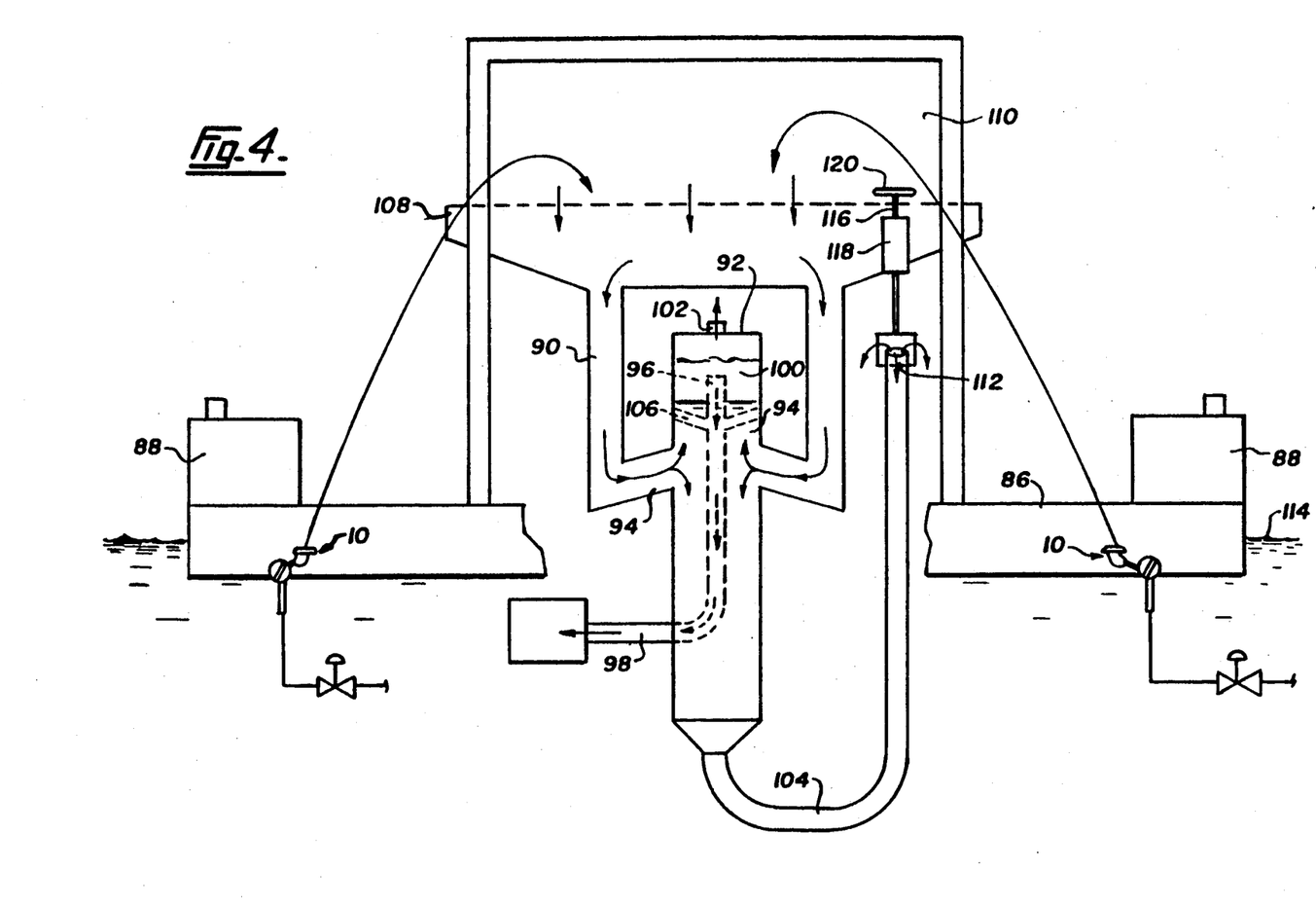
FIG. 4 is a further vessel according to the present invention.

The embodiment of FIG. 4, shows a hull 86, provided with ballast tanks 88, a plurality of jets 10 that are pivotally mounted to the hull 86. The same reference numerals are used as in the previous drawings for the same parts.

There is a central collector 90 having an open top to receive the first and second liquids in the form of jets as shown particularly in FIG. 4. Upwardly directed ports 94 direct liquid into a separator 92 for the first liquid in the collector. Collector 90 has an inlet 96 at its base to receive liquid from the collector 90. There is a weir 96 in the separator 92 for the first liquid and a first liquid outlet pipe 98 communicates with the weir to receive first liquid that builds up in the separator for the first liquid as shown at 100. There is an air outlet 102 in the top of the separator to allow air escape and thus a buildup of the first liquid. There is an outlet pipe 104 for the second liquid at the base of the collector 90. This arrangement is such that first and second liquids may be separated. The first liquid is separated over the weir 96 and into the outlet pipe and the second liquid passes from the base of the open top collector into a flexible tube 104. The outlet pipe 98 of the first liquid is supported by stays 106 extending to the wall of the separator for the first liquid.

The collector has a trough 108 at the top to improve collection and there is a flexible wall 110 to receive the fluid jets and absorb the impact energy of the jet. The surface of the flexible wall is desirable oleophilic so that the oil will move slowly down the surface. Neoprene is an appropriate material.

Flexible tube 104 for the second liquid, usually water, has its outlet 112 above the level 114 of the first and second liquids. There are also means to control the height of the outlet 112. As shown in FIG. 4, a threaded shaft 116 extends through a threaded body 118 attached to the trough 108. By rotating a wheel 120 provided on the top of the threaded shaft 116 the height of the outlet above the surface can be controlled. In this means hydrostatic pressure is high enough to drive the oil through the pipe 98 without the necessity for pumping.

Figure 5:
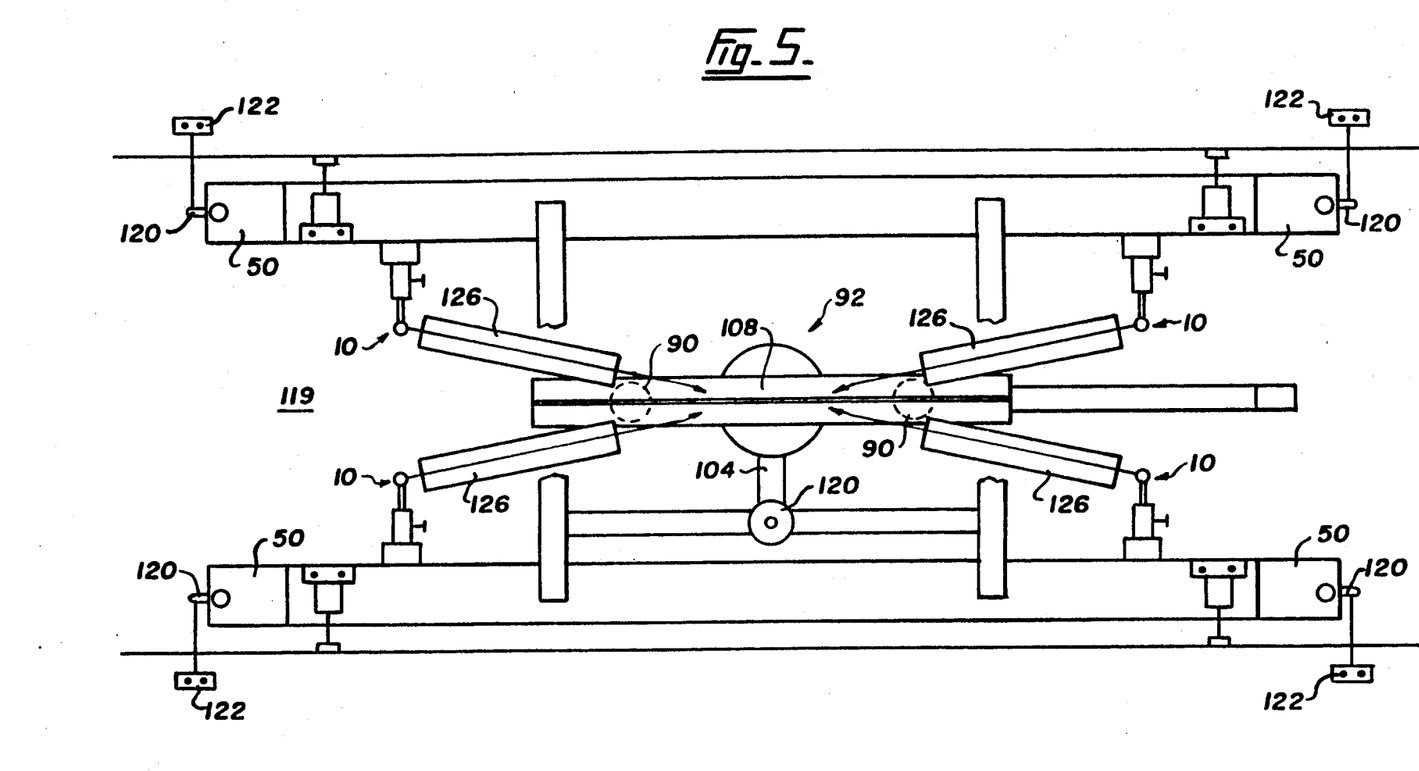
FIG. 5 illustrates yet a further vessel according to the present invention.
Figure 6:
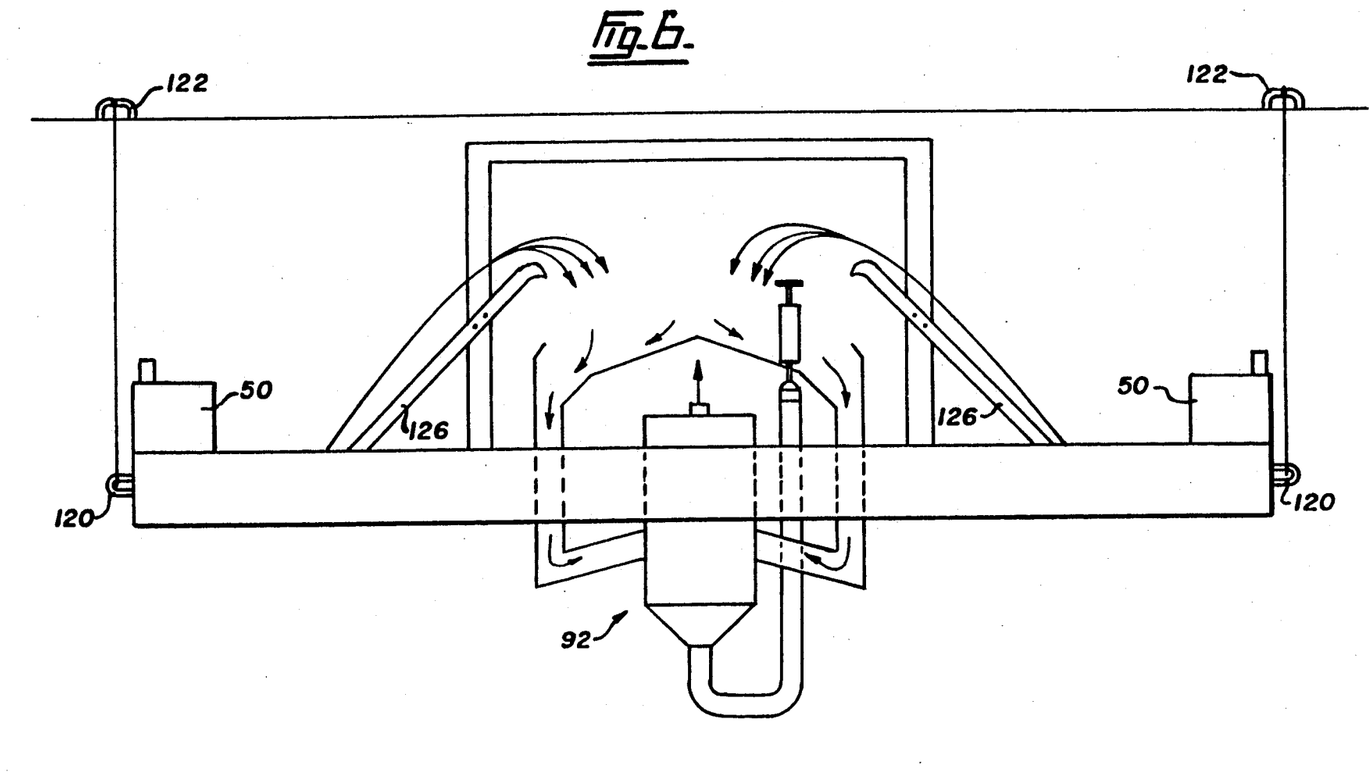
FIG. 6 is a side elevation of the vessel of FIG. 5.

The vessel of FIG. 4 is desirably located in a channel 119 as shown particularly in FIGS. 5 and 6. To that end the vessel is provided with anchor points 120, extending to anchors 122 on the side of the channel 119. There are also stabilizers at each corner of the hull to contact the wall of the channel. Typically, these stabilizers will be hydraulic or pneumatic cylinders.

A further important feature as shown in FIG. 5 is the presence of troughs 126 to receive the liquid jets from the separator jets 10. These troughs 126, which are shown in FIGS. 5, 6 and also perhaps in more detail in FIG. 7, can be used so that the jet forces solid particles, up to a few ounces in weight, upwardly along the trough 126 and into the collector. These solid particles can, for example, be globules of tar and the like.

The apparatus of FIGS. 4, 5 and 6 is used in the manner of the vessel shown in FIG. 3. The trim of the vessel is controlled by ballast and turning on a pressurized supply of a transport fluid, typically steam or water, acts to move the upper surface of the liquid, comprising mainly oil, and in the case of FIGS. 5 and 6, lightweight solids, forced into the collector. As shown in FIG. 4, oil from the top is fed through a pipe where it may be stored or treated while water is fed back into the main body.

Figure 7:
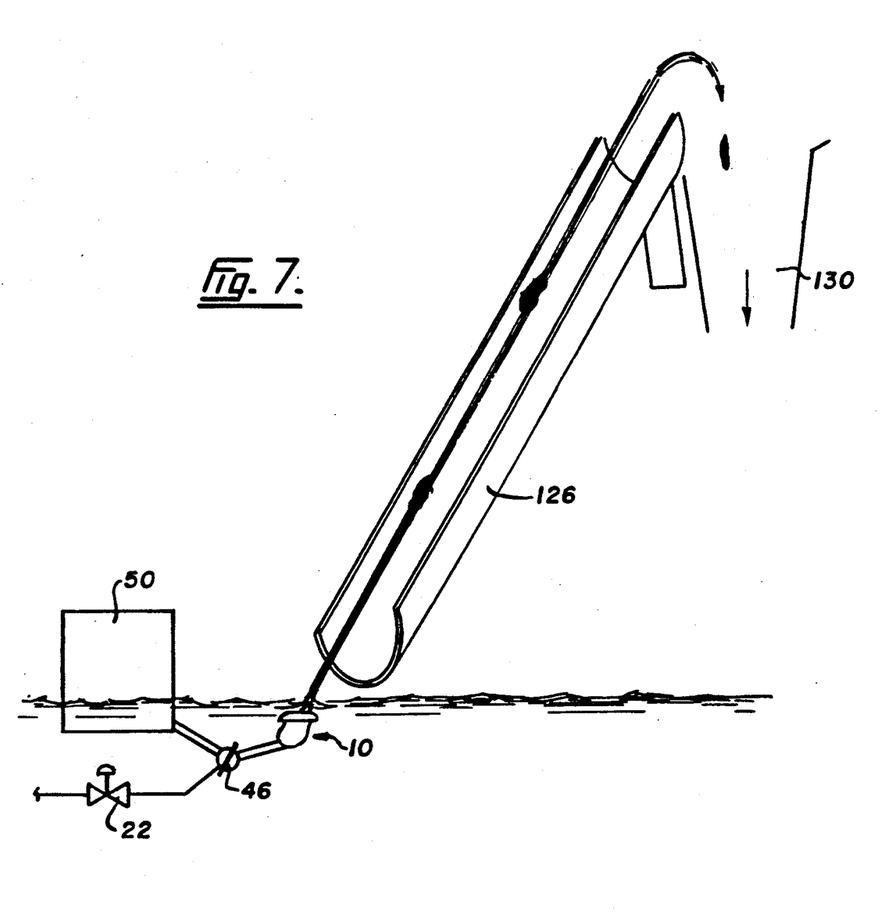
FIG. 7 illustrates an aspect of the invention.

FIG. 7 illustrates a further aspect which is, in effect, a simplification of the use of a trough 126. FIG. 7 shows a separator jet 10, pivotal joint 46, a float 50 and a valve 22 in a supply line 20 as shown in FIGS. 1 and 2. The jet feeds through a trough 126 into a receptacle 130, as shown schematically in FIG. 7. In this way, solid particles may be forced up. In this regard, the device may be used to remove solid particles, that is there need not be a polluting liquid floating on the body of water. It is desirable that the liquid jet not contact the trough as it may dissipate its power, and thus its ability to move solid objects, by splaying along it.

The present invention provides a compact apparatus. The amount of piping that is required is small. The prior art problems of debris entering the pump are reduced. Furthermore, there is little tendency to emulsify the upper layer. The device operates by using the pressure of the transport fluid and the circuit is thus only a few inches within the main body. As a result, and because of the shape of the interior of the main body, there is little dwell or agitation of the two liquids within the main body. The transport fluid can entrain a volume many times larger than its own volume as the water near the surface is drawn in and added to the transport fluid volume. High pressure may be used for the transport fluid thus decreasing the need for large diameter piping which has considerable inertia. This decrease in inertia is important as flotation systems that use the apparatus of the invention must follow changes in the surface quickly to maintain the optimum level for the jets.

A further advantage is that when the upper liquid approaches approximately one quarter inch in thickness, the intake into the main body will be largely oil so that the jet discharged from the outlet nozzle will be merely oil and transport medium.

The invention permits the use of a heated transport medium, for example steam, which is an advantage in most circumstances, particularly in cold weather, but also obviates the necessity for a dispersant in most conditions. However, the invention also permits the use of a dispersant, in small volumes, if conditions require it, for example if the floating liquid is highly weathered oil.

We claim:

1. A separator jet to separate a first liquid from a second liquid upon which the first liquid is floating, the separator jet comprising:
    a main body having a base and a top;
    an inlet nozzle in the base to receive a transport fluid from a source of transport fluid;
    an outlet nozzle having a base with an inlet opening having a diameter larger than the inlet nozzle opening, positioned adjacent to the inlet nozzle to receive fluid from the inlet nozzle and positioned within the main body to define an inlet for the first and second liquids in the top of the main body and a passageway between the outer surface of the outlet nozzle and the inner surface of the main body, connecting said inlet in the top of the main body with said outlet nozzle inlet opening, to receive the first and second liquids and to allow the first and second liquids to be transported by the transport fluid out of the outlet nozzle.

2. A separator jet as claimed in claim 1 in which the main body is generally tulip shaped having an opening in the base to receive the inlet nozzle, the inlet nozzle being largely outside the main body.

3. A separator jet as claimed in claim 2 in which the opening is threaded to receive a contoured threaded flange on the inlet nozzle.

4. A separator jet as claimed in claim 3 including support members extending from the flange to carry the outlet nozzle.

5. A separator jet as claimed in claim 1 in which the outlet nozzle is generally tulip shaped.

6. A separator jet as claimed in claim 1 including an additional inlet for a dispersant whereby dispersant is applied beneath the first liquid.

7. A separator jet as claimed in claim 6 in which the additional inlet communicates with a passageway surrounding the inlet nozzle.

8. A separator jet as claimed in claim 1 mounted on a float.

9. A separator jet as claimed in claim 8 in which the main body is pivotally attached to the float.

10. A separator jet as claimed in claim 9 including a trough inclined upwardly from the separator jets;
    a receptacle at the distal end of the trough, whereby solid particles can be forced up the trough to the receptacle by the jet.

11. A vessel useful to remove a first liquid floating on a second liquid from the second liquid, the vessel comprising:
    a hull;

at least one separator jet, each jet comprising:

a main body having a base and a top;

a first inlet in the base to receive a transport fluid from a source of transport fluid;

an inlet nozzle fed by the first inlet;

an outlet nozzle having a base with an inlet opening having a diameter larger than the inlet nozzle opening, positioned adjacent to the inlet nozzle to receive fluid from the inlet nozzle and positioned within the main body to define an inlet with the first and second liquids in the top of the main body and a passageway between the outer surface of the outlet nozzle and the inner surface of the main body, connecting said inlet in the top of the main body with said outlet nozzle inlet opening, to receive the first and second liquids and to allow the first and second liquids to be transported by the transport fluid out of the outlet nozzle.

12. A vessel as claimed in claim 11 having the source of transport fluid on the hull;

a boom extending outwardly from the hull and supported by a float remote from the hull;

a plurality of separator jets mounted on the boom to receive transport fluid from the hull.

13. A vessel as claimed in claim 12 in which the boom is hollow and receives first pipe along which transport fluid is passed.

14. A vessel as claimed in claim 12 in which the hull has a dispersant supply;

a second pipe in the boom to transport a supply of dispersant to each separator jet.

15. A vessel as claimed in claim 12 in which the hull includes a supply of ballast;

a third pipe in the boom to supply ballast to the float.

16. A vessel as claimed in claim 12 having a plurality of booms extending from the stern of the hull.

17. A vessel as claimed in claim 11 having a plurality of separator jets:

a central collector having;

an open top to receive the first and second liquids and the transport fluid from the plurality of separator jets;

a separator for the first liquid in the collector having an inlet it its base to receive liquid from the collector;

a weir in the separator for the first liquid;

a first liquid outlet pipe communicating with the weir to receive first liquid;

an outlet tube for the second liquid in the base of the collector whereby the first and second liquids may be separated, the first liquid over the weir and into the first liquid outlet pipe and the second liquid from the base of the open top collector.

18. A vessel as claimed in claim 17 in which the collector has a trough at the top to improve collection.

19. A vessel as claimed in claim 18 including a flexible wall on the trough to receive the fluid jets and absorb impact energy of the jets.

20. A vessel as claimed in claim 17 in which the second liquid outlet tube has an outlet that can be positioned above the level of the first and second liquids;

means to control the height of the outlet of the second liquid outlet pipe.

21. A vessel as claimed in claim 17 constructed and arranged to be located in a channel.

22. A vessel as claimed in claim 21 having stabilizers at each corner of the hull to contact the wall of the channel.

23. A vessel as claimed in claim 17 including a trough inclined upwardly from each separator jet to communicate with the collector, whereby solid particles will be forced up the trough to the collector by the jets

* * * * *